(12) United States Patent
Jackson et al.

(10) Patent No.: US 10,239,218 B1
(45) Date of Patent: Mar. 26, 2019

(54) STRUCTURAL FRAME FOR COVERED AND ANIMATED SEGMENTS OF A ROBOTIC FIGURE

(71) Applicant: DISNEY ENTERPRISES, INC., Burbank, CA (US)

(72) Inventors: Philip John Jackson, Glendale, CA (US); Leslie Margaret Evans, La Crescenta, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/883,426

(22) Filed: Jan. 30, 2018

(51) Int. Cl.
*A63H 33/00* (2006.01)
*B25J 18/06* (2006.01)
*B25J 11/00* (2006.01)
*B25J 18/00* (2006.01)

(52) U.S. Cl.
CPC ............. *B25J 18/06* (2013.01); *B25J 11/003* (2013.01); *B25J 18/005* (2013.01); *Y10S 901/27* (2013.01)

(58) Field of Classification Search
CPC . A63B 43/00; A63H 3/00; A63H 3/36; A63H 33/00; A63H 33/18; A63H 33/103; A63H 37/00; A63H 37/005
USPC .................. 446/330, 370, 379–380, 486–487
See application file for complete search history.

(56) References Cited

U.S. PATENT DOCUMENTS

| | | | |
|---|---|---|---|
| 3,218,071 A * | 11/1965 | Richard | A63B 43/00 446/457 |
| 5,980,813 A | 11/1999 | Narang et al. | |
| 6,228,923 B1 | 5/2001 | Lombardi et al. | |
| 6,669,736 B2 | 12/2003 | Slemker et al. | |
| 6,896,577 B1 * | 5/2005 | Feng | A63H 33/18 446/46 |
| 8,366,789 B2 | 2/2013 | Summit | |
| 9,327,350 B2 | 5/2016 | Mannella et al. | |
| 9,744,722 B2 | 8/2017 | Rodgers | |
| 2015/0192919 A1 | 7/2015 | Sketch et al. | |
| 2017/0022341 A1 | 1/2017 | Bayer et al. | |
| 2017/0027624 A1 | 2/2017 | Wilson et al. | |

(Continued)

OTHER PUBLICATIONS

Locker, 3D Printed Robots—25 Robots You Can Buy, 3D Print, or Build,: https://all3dp.com/1/3d-printed-robot-print-robots/ Oct. 10, 2017.

(Continued)

*Primary Examiner* — Kien T Nguyen (74) *Attorney, Agent, or Firm* — Marsh Fischmann & Breyfogle LLP; Kent A. Lembke (57) ABSTRACT

A robot with an animated segment including a generally cylindrical structural frame. The frame includes a plurality of spaced apart plastic ribs that each have a curved or arcuate body that is arranged to be convex relative to a central axis of the structural frame. A first end of each rib is pivotally coupled with a lower ring, and a second end of each rib is pivotally coupled with an upper ring. A flexible outer covering is positioned over the structural frame and is attached to one or more of the ribs. This provides a robotic segment that is animated with an organic feel and natural movement by providing an actuator in the robot segment that is operated by a controller to move one or both of the rings such as linearly along a central axis of the structural frame (e.g., toward and away from the other ring).

19 Claims, 6 Drawing Sheets

(56) References Cited

U.S. PATENT DOCUMENTS

2017/0151733 A1    6/2017   Lewis et al.
2017/0165792 A1    6/2017   Buller et al.

OTHER PUBLICATIONS

Saunders, "LLNL Successfully Creates 4D Printed Flexible, Stretchable Composite Silicone Materials with Shape Memory," 3D Printing, 3D Printing Materials, Science & Technology Sep. 14, 2017.
AON3D, Industrial 3D Printers, https://www.aon3d.com, Oct. 16, 2017 Oct. 16, 2017.
"How 3D Printing is Creating Lifelike Newborns with Functioning Organs to Help Doctors Save Lives," https://medium.com/extreme-engineering/how-3d-printing-is-creating-newborns-with-functioning-organs-to-help-doctors-save-lives Oct. 16, 2017.
"World-first Operation Implants 3D-Printed Titanium Ribcage and Sternum" Sep. 14, 2015.

\* cited by examiner

STRUCTURAL FRAME FOR COVERED AND ANIMATED SEGMENTS OF A ROBOTIC FIGURE

BACKGROUND

1. Field of the Description

The present description relates, in general, to design of structural support elements or frames for robots or robotic figures, and, more particularly, to a structural frame (and robots or robotic figures including such a structural frame) for use in sections or segments (or subassemblies) of robots or robotic figures that have an outer covering and that are animated or have motion during operations of the robot or robotic figure. For example, the robot section or segment may be covered with skin, a layer of fur, a feathered layer, and so on that moves with changes in the shape of the underlying structural frame.

2. Relevant Background

There is an increasing use of robots (or robotic figures) in a wide variety of applications in which it is desirable for the robotic figures to have a natural look and to also move in a natural and expected manner. To this end, robotic figures often are designed to include an outer covering such as a layer of skin when the robotic figure is human or human-like or a layer of fur or coat of feathers when the robotic figure is an animal or a bird. These outer coverings generally will be formed of materials that are flexible so that they can move with the underlying robotic components such as a structural support element or frame for the outer covering.

A design challenge for such robotic figures is how to move the underlying robotic components or mechanisms while also providing movement of the outer covering that appears natural or organic. For example, the robotic figure may take the form of an animal with a fur coat or a humanoid with a skin layer, and it is desirable for the fur coat or skin layer to move in an expected and typically smooth manner with the underlying robotic figure components that may be used to represent the figure's skeletal structure and musculature.

One problem facing designers of robotic figures is how to make a support structure or frame for a character that allows for bend and flexibility and still looks realistic when an outer coating is applied. Further, the support structure or frame needs to stand up to the rigors of extended and repeated use in many applications without requiring frequent maintenance. Additional design problems arise when there is a need for the robotic figure to be relatively small such as to provide an animated character that could be handheld. In such cases, there is extremely limited space in the body for mechanical and costuming elements, and there is a desire to design bodies including structural frames that move realistically but have the smallest form factor that is practical and that are relatively low weight in their construction to reduce actuation forces required to animate the structural frame.

Existing designs for structural frames of covered robotic figures involve use of a rigid metal frame. The metal frame may include springs, cables, and other elements to assist in providing desired movements. This metal frame is positioned within an outer covering, which can be challenging in itself as it may be like stuffing the metallic frame into a tight sock or sleeve. There are a number of problems with existing metal frames. These frames are heavy such that significant amounts of actuation force is required for animation. Further, it can be difficult to control the deformation of the metal frame components such that movement of the outer covering can have an unnatural appearance. The metal frame may have sharp edges that can be seen through the outer covering and can cause excessive wear during prolonged and repeated use of the robotic figure. Additionally, metal robotic frames can produce unwanted sounds during operations such as squeaking, rattling, clanking, and the like that typically are not associated with the character being presented by the robotic figure. The complexity of many existing frames makes their use impractical when small space is a design factor for the segment or section of the robotic figure.

Hence, there remains a need for improved structural frames for robots or robotic figures. Preferably, the new structural frames would be relatively light, would have small form factors (e.g., be useful in handheld-type robotic figures), would produce little or no noise when deformed, and would deform in a more organic and natural manner while being long lived even under repeated deformation over long periods of time.

SUMMARY

In brief, a structural frame for animated robotic segments was designed by the inventors that can be used to replace heavy, noisy, and complex metallic structures. The structural frame is formed of a plurality of curved or arcuate ribs extending between two support members or actuable elements, and the ribs are used to support (and may be attached to) a flexible outer covering such as a character's skin or coat (e.g., a fur coat, a coat of feathers, or the like). An actuator can then be used to apply a force upon one or both of the support members, which may take the form of circular rings or plates, to move it linearly toward and away from the other support member and/or to twist the support member about a central or longitudinal axis. Each of the ribs may be formed as a segment of a circle, ellipse, or oval or take another useful shape, and the ribs have an elongate body that can be formed, such as by using 3D printing, injection molding, or the like, so as to withstand repeated elastic deformation. In this manner, the animation of a robotic segment including the structural frame supporting the outer covering appears natural and organic to an observer.

More particularly, a robotic apparatus (e.g., a robot or robotic figure) is provided that includes a first support member and a second support member space apart from the first support member. The robotic apparatus also includes a plurality of spaced apart ribs extending between the first and second support members, and each of the ribs has a flexible elongate body that is coupled at a first end to the first support member and at a second end to the second support member. The robotic apparatus further includes an actuator or driver applying an actuating force (e.g., in response to control signals from a controller) upon at least one of the first and second support members to move the at least one of the first and second support members between first and second positions causing each of the ribs to be elastically deformed.

In some embodiments of the robotic apparatus, the flexible elongate body of each of the ribs has a curved shape and is oriented to be convex relative to a longitudinal axis extending through the first and second support members. For example, the curved shape may be a segment of a circle, an ellipse, or an oval. The flexible elongate body can be formed of plastic as a unitary member such as through the use of 3D printing, injection molding, or the like. In some cases, the unitary member has a circular cross sectional shape with a uniform outer diameter along the length of the flexible elongate body such as in the range of 0.0625 to 0.5 inches.

In the same or other embodiments, the first end of each of the ribs is attached to an outer edge of the first support member, and the second end of each of the ribs is attached to an outer edge of the second support member. The first and second support members may be positioned in first and second planes, and the first and second planes may be parallel to each other such that the actuating force applied by the actuator moves the at least one of the first and second support members linearly along a longitudinal axis passing through the first and second support members to alternate between decreasing and increasing a distance between the first and second support members (e.g., an accordion-like movement).

The first and second ends of each of the ribs can be pivotally coupled to the outer edge of the first and second support members, respectively. The first and second support members may be rings (or circular plates) with the same or differing outer diameters, and the first and second ends of each of the ribs may formed as a head or endcap with a conduit or lumen for receiving the ring of the first and second support members, respectively. The heads of the first ends of the ribs may have a combined length matching a diameter of the ring of the first support member and the heads of the second ends of the ribs may have a combined length matching a diameter of the ring of the second support member. Typically, the robotic apparatus will also include a flexible outer covering, e.g., a skin, a coat, or the like, extending over the ribs, and the flexible outer covering may be coupled to the ribs (e.g., attached at the first and second ends and/or along the length of the rib body) to move with the ribs when the actuating force is applied by the actuator and the rib bodies are elastically deformed.

The actuator may be adapted to apply linear and/or torsional (or rotating type) forces upon the plurality of ribs. The ribs are uniquely configured to be respond in a "squishy" manner in that they individually and in combination can flex in all directions including torsionally in any angular direction as well as more linearly (or along their longitudinal axis).

DETAILED DESCRIPTION OF THE PREFERRED EMBODIMENTS

In brief, the inventors recognized that existing metal frames used in robotic figures were often heavy, relatively complex to fabricate and assemble, noisy during use, and too large for many smaller form factor robot designs. To present a new design, the inventors determined that it may be beneficial to utilize lightweight plastic components in a structural frame that could be easily manufactured such as by 3D printing, injection molding, or the like.

To this end, a generally cylindrical structural frame may be provided using a plurality of spaced apart plastic ribs that each have a curved or arcuate body that is arranged to be convex relative to a central axis of the structural frame (i.e., to bend outward). A first or lower end of each rib may be pivotally coupled with a bottom or lower ring (first ring), and a second or upper end of each rib may be pivotally coupled with a top or upper ring (second ring). A flexible outer covering such as a skin, a layer of fur, a coat with feathers or other texturing is positioned over the structural frame and may be attached to one or more of the ribs (at one or more locations along each rib length). This provides a robotic segment that can then be animated with an organic feel and natural movement such as by providing an actuator or driver in the robotic figure segment that is operated by a robot controller to move one or both of the rings such as linearly along a central axis of the structural frame (e.g., toward and away from the other ring). Such movement of at least one of the rings toward and away from the other ring causes a thinning and fattening of the robotic segment as the outer diameter of the structural frame increases from an at-rest state (first state) or value to a deformed or squished state (second state) or value supported by the elastic deformation or bending of the ribs with ring movement.

Figure 1:
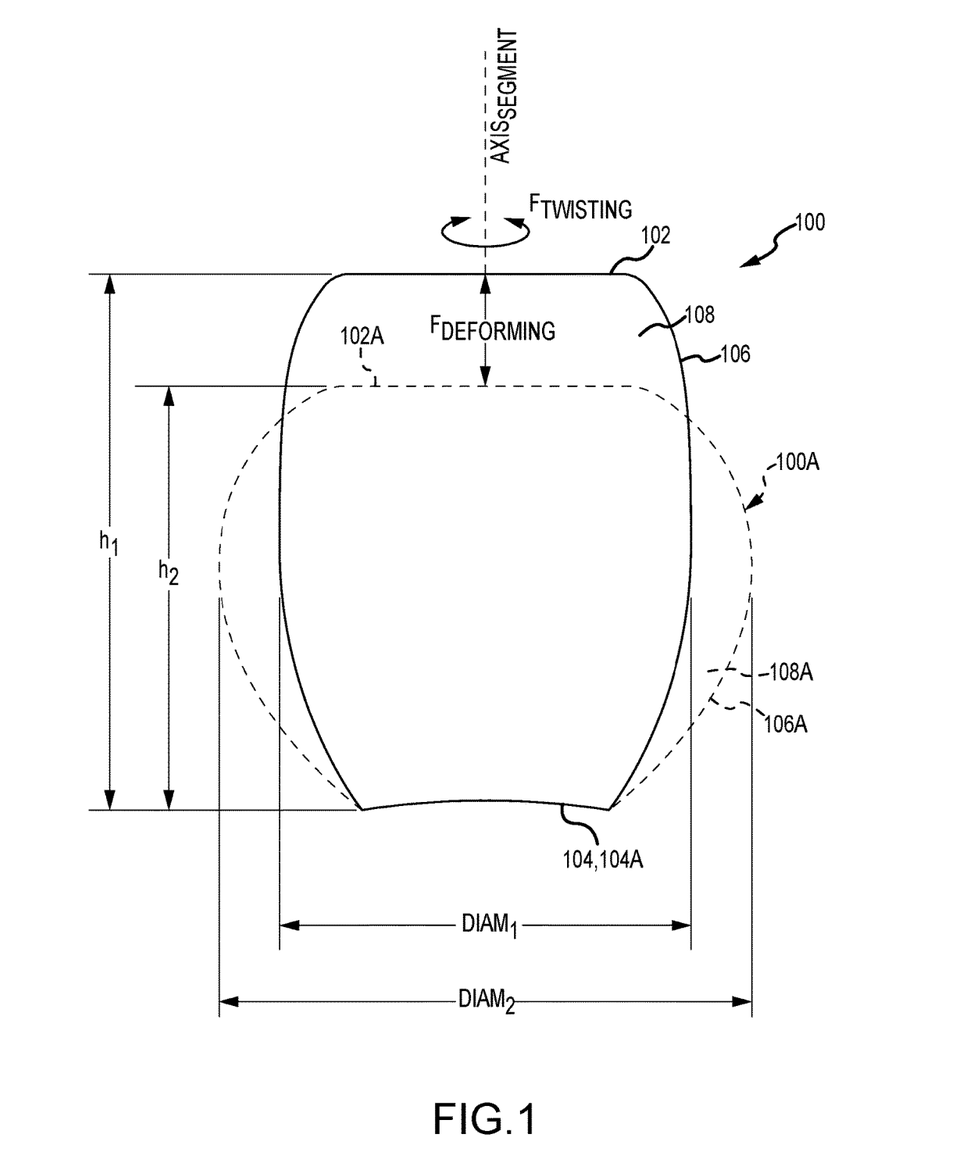
FIG. 1 is a side view of a segment or body of a robotic figure in a first state (e.g., a first position or an at-rest position) and a second state (e.g., a second position or a deformed position)

FIG. 1 is a side view of a segment or body 100 of a robotic figure in a first state (e.g., a first position or an at-rest position) and the same segment or body 100A in a second state (e.g., a second position or a deformed position). The robotic figure segment 100, 100A is shown to be generally cylindrical with a central axis, $Axis_{Segment}$. In the first state or with the segment 100 at rest, the segment 100 is shown to include a top edge/ring or side 102 and a spaced apart bottom edge/ring or side 104, which are connected by a sidewall 106 that is curved or arcuate in shape and convex relative to the central axis, $Axis_{Segment}$, so that segment takes on a more barrel-like to egg-like to spherical shape rather than having straight or vertical sides. As will be explained in more detail below, the sidewall 106 is formed with an outer covering 108 that extends over an inner structural frame (not shown in FIG. 1), and the outer covering 108 may take the form of nearly any flexible layer such as a skin, a coat, or the like used to hide robotic components and to present an outer appearance consistent with a character provided by a robotic figure including the segment 100.

In the first state, the segment 100 has a first height, $h_1$, and a first outer diameter, $Diam_1$ (as measured as a largest outer diameter of the sidewall 106). A linear actuating or deforming force, $F_{Deforming}$, is applied along the axis, $Axis_{Segment}$, and this causes the top edge/ring 102A to move a distance toward the lower edge/ring 104A (which is stationary in this example). Concurrently, the sidewall 106A is deformed (as is the underlying structural frame (not shown as it is covered by outer coating 108)) such that the segment 100A in this deformed or second state now has a second height, $h_2$, that is smaller than the first height, $h_1$, (such as 5 to 30 percent or more smaller) and has a second outer diameter, $Diam_2$, that is greater than the first outer diameter, $Diam_1$, (such as 5 to 30 percent greater).

In the example of FIG. 1, the lower edge/ring 104, 104A is stationary while an actuator/driver (not shown in FIG. 1) is used to provide linear movement of the upper edge/ring 102, 102A between the first and second states of the segment 100, 100A. In the same or another embodiment of the segment 100, 100A, an actuator may be used to apply a torque or twisting force, $F_{Twisting}$, on the edge/side 102 to rotate it to a new position/state 102A that would cause the sidewall 106 to also move to a new state 106A relative to the central axis, $Axis_{Segment}$ (along with the underlying structural frame supporting the outer covering 108 and connected to the upper and lower edges/rings 102, 104).

Figure 2:
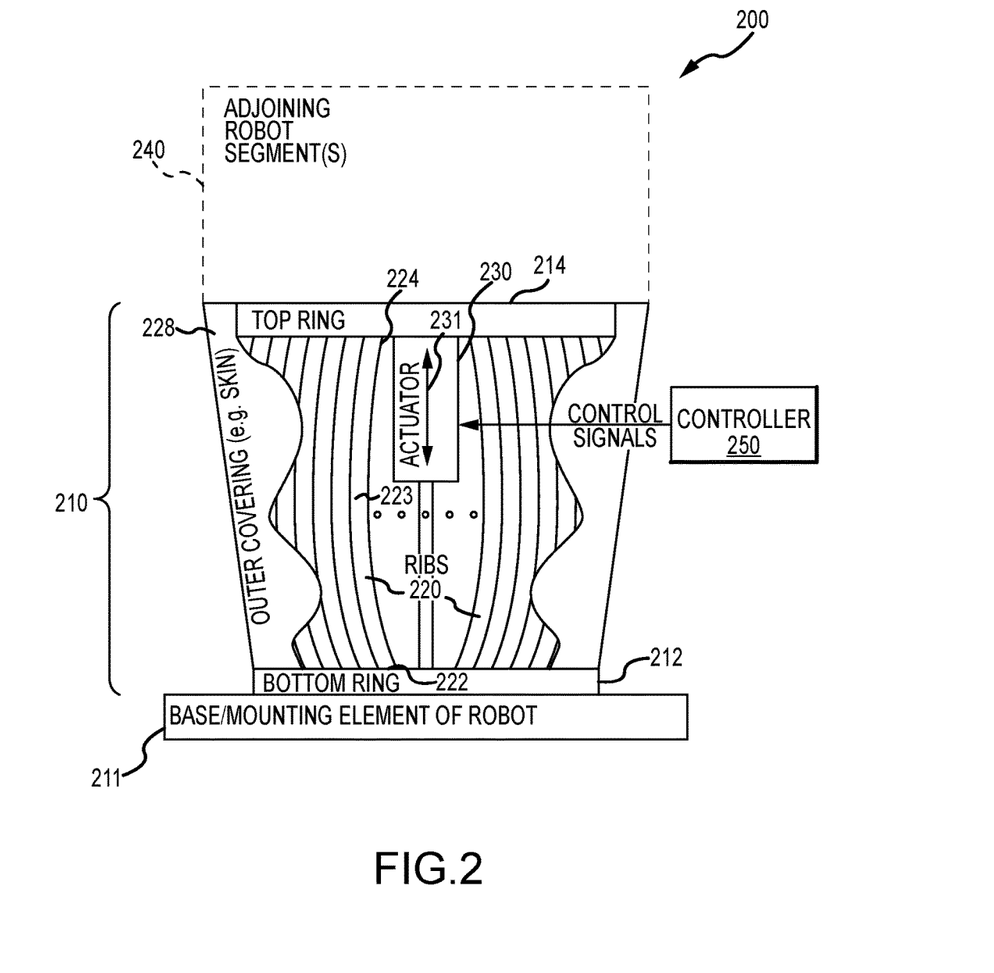
FIG. 2 is a functional block diagram of a portion of a robotic figure or robot including a segment with a structural frame of the present description.

FIG. 2 is a functional block diagram of a portion of a robotic figure or robot 200 including a segment 210 with a structural frame of the present description. The robotic figure 200 may include only the portions shown or additional segments or subassemblies, and it may be used to perform movements associated with a particular character or animal (fictional or nonfictional) or it may be used to perform nearly any function demanded of a robot. In many entertainment applications or applications that involve interaction with humans, the robotic figure 200 will be covered to take on a less mechanical appearance or to look like a character or animal. To this end, the robotic segment 210 is shown to include an outer coating 228 over its mechanical components including a structural frame of the present description (e.g., ribs 220 attached to a top ring 214 and a bottom ring 212), and the outer coating 228 may take the form of a flexible rubber or plastic skin, a fabric coat or layer covered with fur, feathers, and so on, or the like. Generally, the outer covering 228 is designed to hide the inner robotic components, to take on a desired appearance, and to be flexible enough to move with the underlying and abutting structural frame components (e.g., the ribs 220).

As shown, the robotic figure 200 includes a base (or a mounting element that can connect to another robotic segment not shown in FIG. 2) 211, and the segment 210 is attached to the base 211 via bottom ring or connector 212. In this embodiment, the bottom ring 212 is stationary relative to the base 211, and the base 211 may be stationary or fixed in place (e.g., mounted to a fixed or moving structure) or may be moved with the robotic figure 200 or with a subassembly/segment not shown in FIG. 2. The robotic figure 200 further includes an adjoining robot segment or subassembly 240 located proximate to a top ring 214 of the segment 210 (and may be coupled to move with top ring 214 in some embodiments), and top ring or plate 214 typically is spaced apart a distance from the bottom ring 212 (e.g., the height of the segment 210 in a first state or in an at-rest position). The bottom ring (or first ring) 212 and the top ring (or second ring) 214 are often arranged to be parallel to each other and to share a central axis (e.g., the central or longitudinal axis of the generally cylindrical segment 210 (i.e., a body with a shape with a circular cross section)).

The segment 210 further includes an actuator (or driver) 230 that operates in response to control signals, which may be provided in a wired or wireless manner, from a controller 250 of the robotic figure 200 to apply a driving or deforming force upon the top ring 214. This actuation causes the top ring 214 to move as shown with arrow 231 up and down or toward and away from the bottom ring 212 such as by moving the ring 214 a predefined distance (or a range of distances) along the center longitudinal axis of the segment 210 (i.e., an axis passing through the center of ring 214 (and, typically, ring 212)) toward the bottom ring 212 and then back again. This may be thought of as moving the ring 214 from a first or at-rest position (or state of segment 210) to a second or deformed position (not shown) (or state of segment 210) and then back again in a repeated and/or repeatable manner.

Significantly, the segment 210 has a structural frame supporting the outer covering 228 that includes a plurality of spaced apart ribs 220, with the spacing varying to practice the robot 200 but often in the range of 0.5 to 3 inches. Each rib includes an elongated body 223 that may be coupled at a first end 222 to the bottom or first ring 212 and at a second opposite end 224 to the top or second ring 214. The coupling may be rigid in some cases (e.g., ends 222, 224 do not move relative to the corresponding ring 212 or 214) while other embodiments may provide for pivotal coupling at one or both ends 222, 224. The elongated body 223 typically is formed (such as via 3D printing, injection molding, or the like) of a flexible material, such as a plastic, that is lightweight but is durable such that it can withstand numerous elastic deformations without breaking. Each body 223 is designed to have an at-rest shape that is curved or arcuate as shown such that the body 223 may be considered an arc or segment of a circle, a segment of an ellipse, a segment of an oval, or the like. Each body 223 may have the same or differing cross sectional shape. In some cases, the cross sectional shape is circular while other embodiments utilize other shapes including rectangular and elliptical and irregular shapes such as a T-shape or the like. The body 223 may have a uniform cross sectional shape and/or size while other embodiments may vary the shape or dimensions to cause the body 223 to be more flexible or to have greater stiffness/rigidity at different locations along the rib body 223 or to achieve a particular deformation suiting expected or desired movement for a body segment of a character being provided by operations of the robotic figure 200. The body 223 may be solid or may be a tube with one or more channels extending from end 222 to end 224 such as for passing liquids or gases (e.g., for cooling or the like) through the segment 320, for passing cables, wires, or the like, or to modify (reduce) the rigidity of the body 223 and/or reduce its weight.

During operations, the top ring 214 is moved as shown with arrows 231 by operation of the actuator 230. This causes the ribs 220 to each bow outward or be deformed as end 224 is moved toward end 222 of each rib 220. The body 223 retains a curved shape as it is extended outward during deformation such that the segment 210 moves from a first outer diameter to a second outer diameter that is typically larger (but may be smaller if deformed to straighten the rib body 223 by actuator 230). In response, the outer cover 228 also moves and has its outer shape changed such as from more cylindrical to more spherical in shape (or vice versa). The animation of the segment 210 is generally more natural and organic due to use of the curved ribs 220 in the structural frame when compared with prior complex metallic support structures, and the curved ribs 220 typically will not have any sharp edges that may show through, or may cause undue wear on, the outer covering 228.

Figure 3:
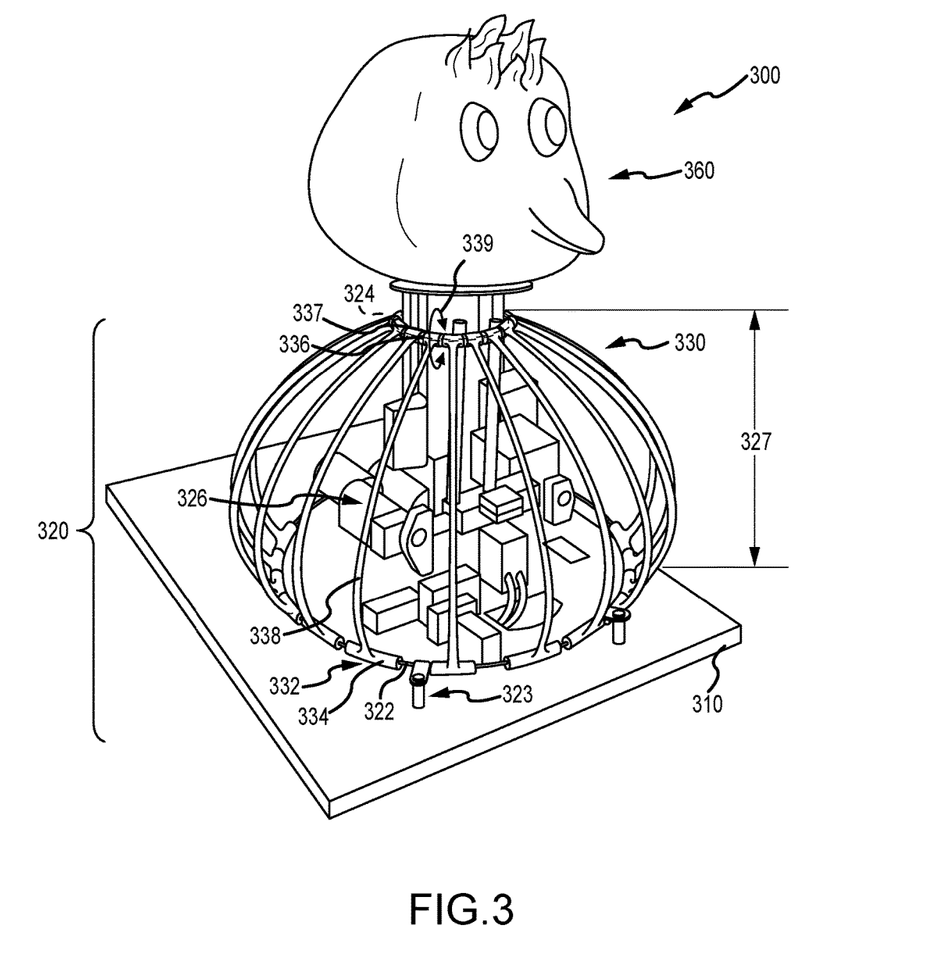
FIG. 3 is a top perspective view of a robotic figure or robot of the present description with an outer covering (e.g., a feathered or fur coat, a skin, or the like) removed to show a structural frame and other components of the animated segment of the robotic figure.

With a general understanding of a structural frame of the present description and how it may be used in a robot, it may now be useful to discuss one exemplary embodiment that the inventors have prototyped and found to be useful in providing a robotically animated character having repeated movements. FIG. 3 is a top perspective view of a robotic figure or robot 300 that includes a support platform or base 310, a robotic segment 320 attached to the support platform 310, and a robotic subassembly 360 adjacent to the robotic segment 320 and opposite the platform 310. In this example robotic figure 300, the robotic segment 320 is designed to function as or simulate a body of a character (e.g., a bird or birdlike creature) while the subassembly 360 is the head of the character, which may move with the body segment 320 and/or independently of the body segment 320. With this in mind, an outer covering (not shown in FIG. 3 but coverings are shown at 108/108A and 228 in FIGS. 1 and 2) may be applied over the robotic subassembly 360 in the form of a flexible feather coat or the like.

The robotic segment 320 is shown in an at-rest or first state prior to actuation/deformation, and the segment 320 has a generally barrel shape (or cylinder with curved or nonlinear sides between its ends) or spherical shape with a first (or at-rest) outer diameter. The robotic segment 320 includes a first or bottom/lower support ring 322, which is attached to the base via connectors/couplings 323 such that the first ring 322 is stationary and does not move relative to the support platform 310. The robotic segment 320 also includes a second or upper support ring 324 spaced apart from the first ring 322 and platform 310 (and near the subassembly 360). The rings 322, 324 may be in two spaced apart and parallel planes such that the rings 322, 324 may be considered to be parallel and spaced apart a distance in the first or at-rest state of the segment 320 that is equal to the at-rest or first height of the segment 320.

The robotic segment 320 includes an actuator 326 that is coupled to the second or top ring 324 and functions (e.g., in response to controller commands or control signals) to move the ring as shown with arrows 327 toward and away from the first or lower/bottom ring 322 such as linearly a distance along a central axis of the ring 324. The actuator 326 may move the ring 324 from a first or at-rest position (shown) to a second (and third) position to place the segment 320 in a second or deformed state, and the actuator 326 may hold the ring 324 in this position or oscillate between the at-rest and deformed (first and second) positions to animate the robotic segment 320 and an outer covering (not shown) placed over the segment 320.

The robotic segment 320 includes a structural frame 330 that includes a plurality of elongated supported members or ribs each with a similar form to rib 332. As shown, rib 332 has a first or lower end 334 that is pivotally coupled with first or lower ring 322 as shown with arrows 335. The rib 332 further includes a second or upper end 336 that is pivotally coupled with second or upper ring 324 as shown with arrows 337. Hence, each of the ends 334, 336 can rotate or pivot 335, 337 about the rings 322, 324 as the upper or second ring 324 is moved 327 by the actuator 326. The rib 332 also includes an elongate body 338 formed (e.g., 3D printed) as a solid member with a circular cross sectional shape. The rib body 338 extends between the two pivotally coupled ends 334, 336 and has a convex shape relative to the central longitudinal axis of the robotic segment 320.

A number of curved shapes may be used such as an arc or segment of a circle or a segment of an ellipse, with the body 338 being shown in this example to take the form of a segment of an oval with its larger diameter portion nearer to first or lower ring 322 than second or upper ring 324. This shape is not limiting but was chosen to represent a body of a character with a stomach/belly area that is larger in diameter than its chest.

During actuator operations, the actuator 326 moves the ring 324 up and down (away and toward the lower ring 322). Such movement causes the rib body 338 to be deformed so as to be pushed inward and outward, respectively, which causes an outer diameter of the segment 320 to shrink as the ring 324 is moved upward to its at-rest position or state (as is shown in FIG. 3) and then to grow or expand as the ring 324 is moved downward to a maximum deformation or deformed state. The pivoting of ends 334, 336 allows the deformation and movement of the body 338 to occur with less force being applied by the actuator 326 and with less wear and/or strain at the connection area/volume between the body 338 and the ends 334, 336.

Figure 4:
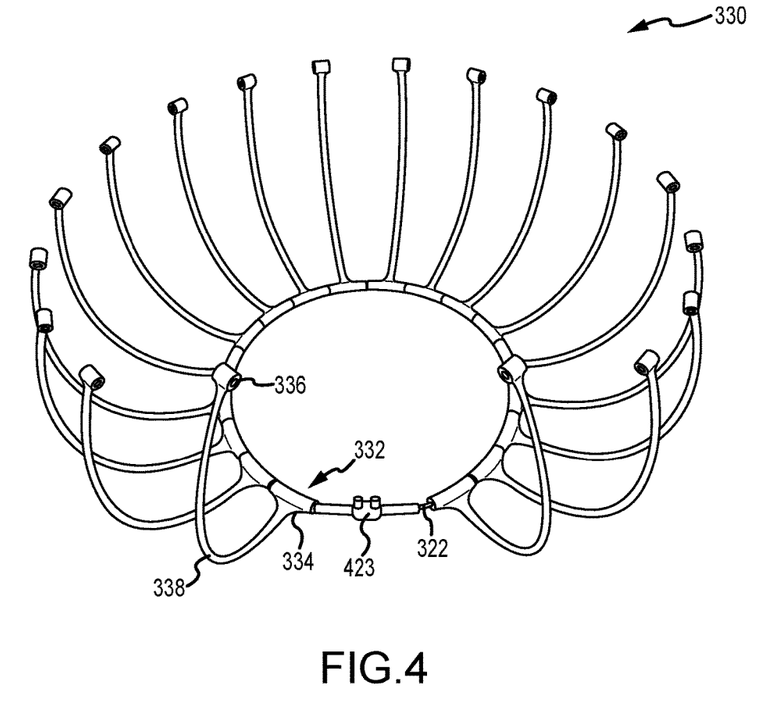
FIG. 4 is a view of the structural frame of the robotic segment during assembly (or disassembly) showing attachment of a bottom (or first) end of each rib to a bottom or first ring.

FIG. 4 shows the structural frame 330 of the robotic segment 320 of FIG. 3 during assembly (or disassembly). As shown, each rib 332 is pivotally coupled at its first or lower end 334 to the first or lower ring 322 by sliding a length or portion of the ring 322 through the end 334, which has a hollow head or endcap (or has a conduit or lumen passing there through). The left and right edges/sides of the hollow head/endcap of the end 334 may abut edges/sides of a pair of adjacent heads/endcaps or a washer/bearing may be placed between ends 334 on the lower ring 322. The ends of the ring 322 may be affixed together with coupling 423 after all of the ribs 332 have been slid onto the ring 322. Similar assembly processes are then followed to pivotally couple the second or upper ends 336 (which are also hollow) to the second or upper ring 324 (not shown in FIG. 4).

Figure 5:
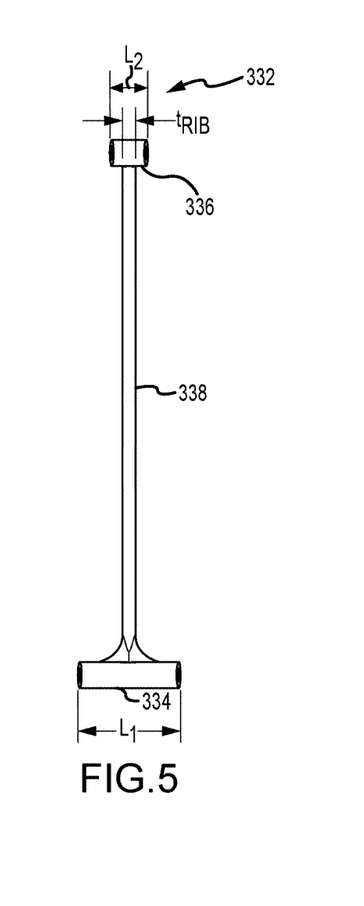
FIG. 5 is an end view of a single rib for use in the structural frame of FIGS. 3 and 4.
Figure 6:
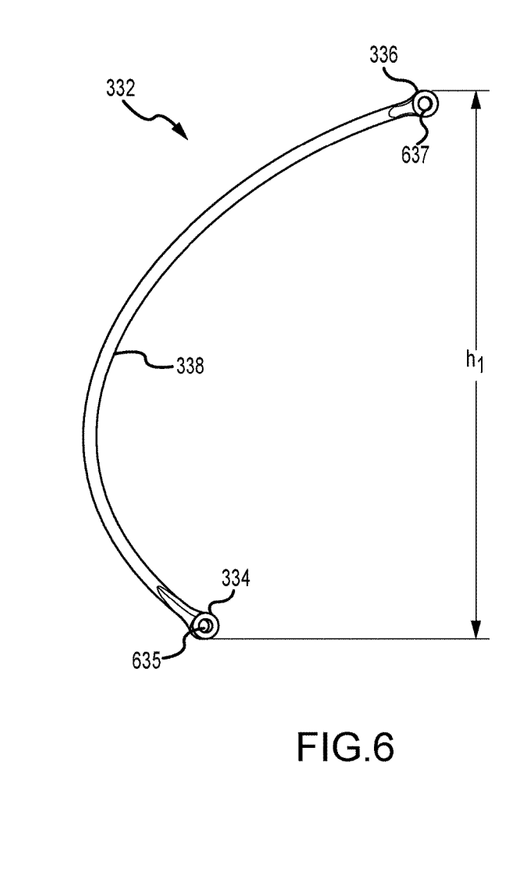
FIG. 6 is a side view of the rib of FIG. 5.
Figure 7:
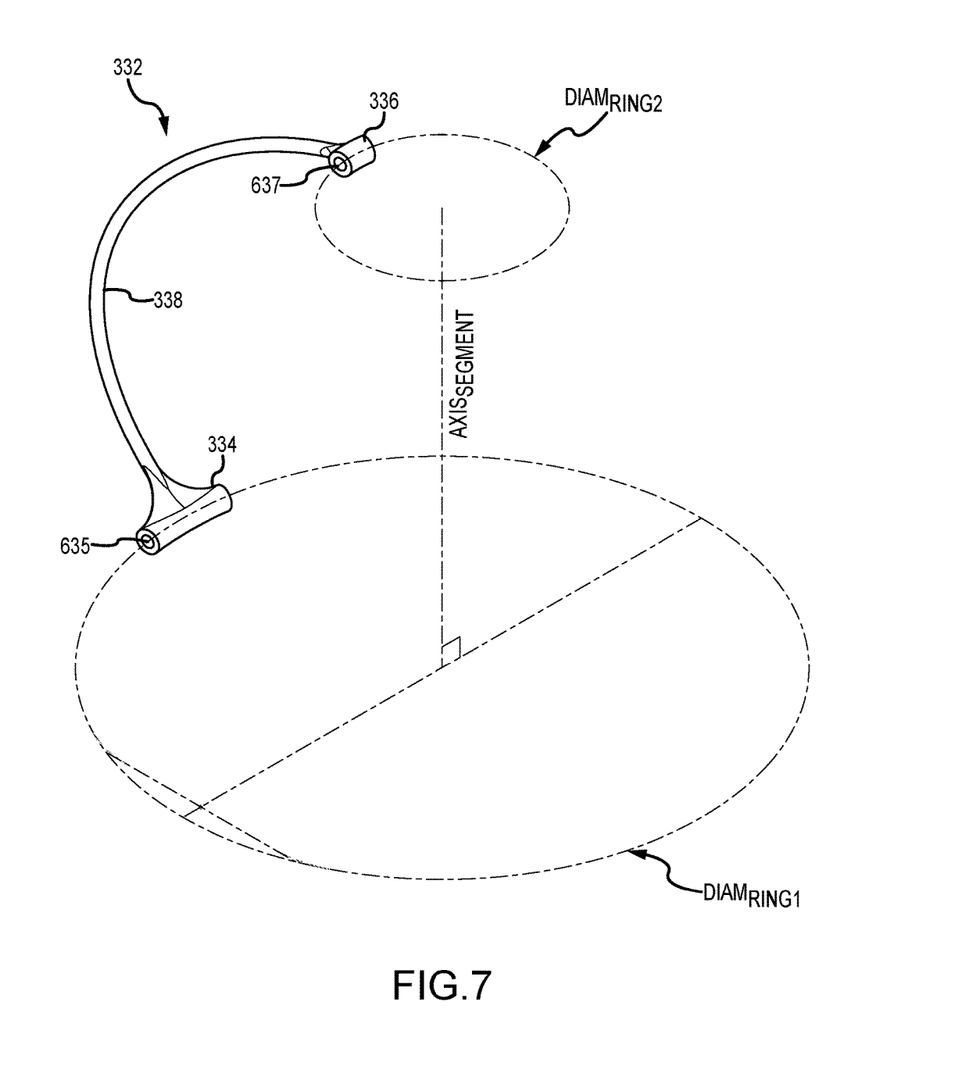
FIG. 7 is a perspective view of the rib of FIGS. 5 and 6 also showing locations of top and bottom (or first and second) rings upon which the ends of the rib is pivotally mounted to form the structural frame of FIGS. 3 and 4.

FIG. 5 is an end view of a single rib 332 for use in the structural frame 330 of FIGS. 3 and 4. FIG. 6 is a side view of the rib 332 while FIG. 7 is a perspective view of the rib 332 showing locations of top and bottom (or second and first) rings 324, 322 upon which the ends 336, 334 of the rib 332 are pivotally mounted to form the structural frame 330 of FIGS. 3 and 4. As shown in FIG. 5, the rib 332 has a body or elongate member 338 that may have a circular cross section with an outer diameter or thickness, $t_{Rib}$, in the range of $\frac{1}{16}$ to $\frac{1}{2}$ inch or more.

The body 338 extends between a first or lower end 334 that has a head or endcap with a first length, $L_1$, and a second or upper end 336 that has a head or endcap with second length, $L_2$, which is smaller than the first length, $L_1$ (e.g., the first length, $L_1$, may be 50 to 100 percent or greater in size than the second length, $L_2$) This design was chosen so that the ends 334, 336 can abut with adjacent ends 334, 336 (no space between rib head/endcaps) when the ribs 334 are pivotally coupled to the rings 322, 324 as shown in FIG. 4, and, in this embodiment, the upper ring 324 is smaller than the lower ring 322 as the $Diam_{Ring2}$ is smaller than the $Diam_{Ring1}$ (e.g., by 50 to 200 percent or more). In other words, the lengths, $L_1$ and $L_2$, are chosen so that upon assembly the ends (or their heads/endcaps) 334, 336 extend nearly wholly about the entire outer diameters, $Diam_{Ring1}$ and $Diam_{Ring2}$ (with spaces that can be left empty between the ends 334, 336 or be fully or partially filled with washers or other bearing members).

FIG. 6 shows that each end 334, 336 or its head/endcap has a conduit or lumen 635, 637 through which one of the rings 322 or 324 may be passed during assembly and to allow the ends 334, 336 to pivot relative to the rings 322, 324 during actuation/deformation of the structural frame 320 by the actuator 326. FIG. 6 is also useful for showing that the rib 332 in its at-rest state or configuration has a body 338 with the shape of a segment of an oval (e.g., is egg-shaped), with a selected height, $h_1$, that is useful as shown in FIG. 7 for allowing it to be pivotally coupled at each of the ends 334, 336 to the lower and upper rings 322, 324 (in their positions corresponding with the first or at-rest state of the robotic segment 320).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

In one useful prototype, custom rib shapes were designed (e.g., segments of an oval with solid bodies with circular cross sectional shapes) that allowed the inventors to 3D print the ribs using a nylon material. The ribs were similar to those shown in FIGS. 5-7, and their unique design allowed them to flex and twist to provide a desired animation for an outer coating and the robotic figure (e.g., to achieve expected motion of a character simulated by the robotic figure) including smooth and organic deformation with return to the original shape/state every time (e.g., during each at-rest to deformation to at-rest cycle performed by the robotic figure segment).

The ribs are lightweight and fast to produce (with 3D printing for example) and stay on design (or on model) as they incorporate efficient design features. It is believed that this new structural frame design will allow robotic figures to move more freely and in convincing, organic ways. Previous frames were made of metal, which often caused them to be heavy and to not bend correctly. Some prior frames were formed of or included planar plastic components that also did not perform (e.g., deform) in a desired manner. Prior designs, when tested, proved to be time consuming to manufacture as they required multiple materials and parts as well as significant hand labor. The use of ribs as shown herein provides a modular design to the structural frame that allows for easier assembly and maintenance including replacement of a single rib if needed rather than the entire body structure as was sometimes the case with more complex metallic robotic body segments.

The ribs of the structural frame are generally lightweight, flexible, and repeatable (both in deformation and manufacture). The ribs may be provided as 3D printed parts, which opens up the ability to print in many different materials as the need arises such as: Acrylonitrile Butadiene Styrene (ABS) plastic, Polylactice Acid (PLA) plastic, polyamide (nylon), glass filled polyamide, stereolithography materials (epoxy resins), photopolymers, and polycarbonate. The same rib design can be made stiffer or more flexible while retaining its dimensions by choosing a different printer material (or, in some cases, using a different 3D printer type to open up different 3D printer materials).

The use of a plastic or similar material and design of the spaced apart ribs of the structural frame is effective in removing a lot of weight from a robotic segment when compared with prior complex metallic configurations. The structural frame example of FIGS. 3-7 is useful in providing a "nice and squishy" robotic segment that is deformable in a natural and organic manner even when covered (such as with a coat of fur or feathers or a rubber or plastic skin). The outer covering can be attached around each or select ones of the ribs to move with the ribs. The ribs may be formed (such as 3D printed) to include attachments such as snap receptacles for the outer covering (e.g., at the ends with one or more along the length of the rib body in some cases) to mate with connectors on the outer covering. The new structural frame design typically produces no noises and is well suited for use in small spaces when size is a design factor as less space is required for its implementation compared with more complex existing designs that include cables, springs, and segmented components. The embodiment of FIGS. 3-7 shows a plurality of spaced apart ribs, but other embodiments may provide two, three, or more of these ribs as a unitary part that can then be assembled to form the structural frame on the lower and upper rings.

We claim:

1. A robotic apparatus, comprising:
   a first support member;
   a second support member space apart from the first support member;
   a plurality of spaced apart ribs extending between the first and second support members, wherein each of the ribs has a flexible elongate body that is coupled at a first end to the first support member and at a second end to the second support member; and
   an actuator applying an actuating force upon at least one of the first and second support members to move the at least one of the first and second support members between first and second positions causing each of the ribs to be elastically deformed,
   wherein the first end of each of the ribs is attached to an outer edge of the first support member,
   wherein the second end of each of the ribs is attached to an outer edge of the second support member,
   wherein the first end of each of the ribs is pivotally coupled to the outer edge of the first support member,
   wherein the second end of each of the ribs is pivotally coupled to the outer edge of the second support member,
   wherein the first support member comprises a ring,
   wherein the first end of each of the ribs comprises a head with a conduit for receiving the ring of the first support member, wherein the second support member comprises a ring, and
   wherein the second end of each of the ribs comprises a head with a conduit for receiving the ring of the second support member.

2. The robotic apparatus of claim 1, wherein the flexible elongate body of each of the ribs has a curved shape and is oriented to be convex relative to a longitudinal axis extending through the first and second support members.

3. The robotic apparatus of claim 2, wherein the curved shape is a segment of a circle, an ellipse, or an oval.

4. The robotic apparatus of claim 3, wherein the flexible elongate body is formed of plastic as a unitary member.

5. The robotic apparatus of claim 4, wherein the unitary member has a circular cross sectional shape with a uniform outer diameter along the flexible elongate body in the range of 0.0625 to 0.5 inches.

6. The robotic apparatus of claim 1, wherein the first and second support members are positioned in first and second planes, wherein the first and second planes are parallel to each other, and wherein the actuating force moves the at least one of the first and second support members linearly along a longitudinal axis passing through the first and second support members to decrease and increase a distance between the first and second support members.

7. The robotic apparatus of claim 1, wherein the heads of the first ends of the ribs have a combined length matching a diameter of the ring of the first support member and the heads of the second ends of the ribs have a combined length matching a diameter of the ring of the second support member.

8. The robotic apparatus of claim 1, further comprising a flexible outer covering extending over the ribs, wherein the flexible outer covering is coupled to the ribs to move with the ribs when the actuating force is applied by the actuator.

9. A robotic apparatus, comprising:
   a first support member;
   a second support member space apart from the first support member;
   a plurality of spaced apart ribs extending between the first and second support members, wherein each of the ribs has a flexible elongate body that is coupled at a first end to the first support member so that the first end is rotatable about an axis extending therethrough and at a second end to the second support member so that the second end is rotatable about an axis extending therethrough and wherein the flexible elongate body of each of the ribs has a curved shape; and a flexible outer covering extending over the ribs, wherein the flexible outer covering is coupled to the ribs to move with the ribs, wherein, during operations of the robotic apparatus, at least one of the first and second support members is linearly moved between first and second positions causing each of the ribs to be elastically deformed and animating the flexible outer covering and at least one of the first and second support members is rotated about an axis extending through the first and second support members.

10. The robotic apparatus of claim 9, wherein the curved shape is a segment of a circle, an ellipse, or an oval.

11. The robotic apparatus of claim 10, wherein the flexible elongate body is formed of plastic as a unitary member.

12. The robotic apparatus of claim 11, wherein the unitary member has a circular cross sectional shape with a uniform outer diameter along the flexible elongate body in the range of 0.0625 to 0.5 inches.

13. The robotic apparatus of claim 9, wherein the first end of each of the ribs is attached to an outer edge of the first support member and wherein the second end of each of the ribs is attached to an outer edge of the second support member.

14. The robotic apparatus of claim 13, wherein the first and second support members are positioned in first and second planes, wherein the first and second planes are parallel to each other, and wherein the actuating force moves the at least one of the first and second support members linearly along a longitudinal axis passing through the first and second support members to decrease and increase a distance between the first and second support members.

15. The robotic apparatus of claim 13, wherein the first end of each of the ribs is pivotally coupled to the outer edge of the first support member and wherein the second end of each of the ribs is pivotally coupled to the outer edge of the second support member.

16. The robotic apparatus of claim 15, wherein the first support member comprises a ring, wherein the first end of each of the ribs comprises a head with a conduit for receiving the ring of the first support member, wherein the second support member comprises a ring, and wherein the second end of each of the ribs comprises a head with a conduit for receiving the ring of the second support member.

17. A robotic apparatus, comprising:
a first support member;
a second support member space apart from the first support member;
a plurality of spaced apart ribs extending between the first and second support members, wherein each of the ribs has a unitary, flexible, and elongate body that is coupled at a first end to the first support member and at a second end to the second support member, wherein the body of each of the ribs has a curved shape and is oriented to be convex relative to a longitudinal axis extending through the first and second support members;
an actuator repeatedly moving at least one of the first and second support members between first and second positions causing each of the ribs to be elastically deformed free of an outside force acting upon the first and second support members; and
an outer covering extending over the ribs that moves with the ribs,
wherein the first end of each of the ribs is attached to an outer edge of the first support member and wherein the second end of each of the ribs is attached to an outer edge of the second support member; and the first and second ends of each of the ribs is coupled so that the first end rotates when the actuator repeatedly moves at least one of the first and second support members between the first and second positions.

18. The robotic apparatus of claim 17, wherein the first end of each of the ribs is pivotally coupled to the outer edge of the first support member, wherein the second end of each of the ribs is pivotally coupled to the outer edge of the second support member, wherein the first support member comprises a ring, wherein the first end of each of the ribs comprises a head with a conduit for receiving the ring of the first support member, wherein the second support member comprises a ring, and wherein the second end of each of the ribs comprises a head with a conduit for receiving the ring of the second support member.

19. The robotic apparatus of claim 17, wherein the body of at least a subset of the ribs is tubular with one or more channels extending between the first and second ends, whereby power lines or cooling liquids or gases can be passed through the body or whereby rigidity and weight of the body is reduced.

* * * * *

UNITED STATES PATENT AND TRADEMARK OFFICE
CERTIFICATE OF CORRECTION

| | | |
|---|---|---|
| PATENT NO. | : 10,239,218 B1 | Page 1 of 1 |
| APPLICATION NO. | : 15/883426 | |
| DATED | : March 26, 2019 | |
| INVENTOR(S) | : Philip John Jackson et al. | |

It is certified that error appears in the above-identified patent and that said Letters Patent is hereby corrected as shown below:

On the Title Page

Item (72), the listing of Inventors should read:
Philip John Jackson, Glendale, CA (US);
Leslie Margaret Evans, La Crescenta, CA (US);
Eli Joseph Romaire, Los Angeles, CA (US);
Frederick Fraleigh, Burbank, CA (US);
Terry Orion Sandin, Los Angeles, CA (US)

Signed and Sealed this
Fourth Day of November, 2025

John A. Squires
*Director of the United States Patent and Trademark Office*